(12) United States Patent
Yoshida et al.

(10) Patent No.: US 7,295,336 B2
(45) Date of Patent: Nov. 13, 2007

(54) DOCUMENT-MANAGEMENT PRINTING SYSTEM HAVING A DISPLAYING UNIT, AND ITS CONTROL METHOD

(75) Inventors: Takuya Yoshida, Tokyo (JP); Hiroya Kumashio, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 727 days.

(21) Appl. No.: 10/280,032

(22) Filed: Oct. 25, 2002

(65) Prior Publication Data

US 2003/0090717 A1 May 15, 2003

(30) Foreign Application Priority Data

| Oct. 26, 2001 | (JP) | ............................ 2001-329798 |
| Dec. 20, 2001 | (JP) | ............................ 2001-387850 |
| Oct. 21, 2002 | (JP) | ............................ 2002-305858 |

(51) Int. Cl.
*G06F 3/12* (2006.01)

(52) U.S. Cl. .................... 358/1.15; 358/1.16; 715/748; 709/217; 709/219; 707/10

(58) Field of Classification Search ............... 358/1.15, 358/1.16, 1.2; 715/748; 707/10; 709/217, 709/219
See application file for complete search history.

(56) References Cited

U.S. PATENT DOCUMENTS

| 6,092,090 | A | 7/2000 | Payne et al. |
| 6,181,436 | B1* | 1/2001 | Kurachi ..................... 358/1.15 |
| 6,348,971 | B2* | 2/2002 | Owa et al. ................. 358/1.15 |
| 6,616,359 | B1* | 9/2003 | Nakagiri et al. ............ 400/582 |
| 2001/0026377 | A1 | 10/2001 | Katsumi |
| 2001/0028363 | A1* | 10/2001 | Nomoto et al. ............. 345/748 |
| 2002/0097432 | A1 | 7/2002 | Kumashio |

FOREIGN PATENT DOCUMENTS

| JP | 11-43664 | 5/1999 |
| JP | 11-305982 | 11/1999 |
| JP | 11-327818 | 11/1999 |
| JP | 2000-168166 | 6/2000 |
| JP | 2000-181661 | 6/2000 |
| JP | 2001-125757 | 5/2001 |
| JP | 2001-134561 | 5/2001 |
| JP | 2001-195220 | 7/2001 |
| JP | 2001-243041 | 9/2001 |
| JP | 2001-256010 | 9/2001 |
| WO | WO 01/24053 | 4/2001 |

* cited by examiner

*Primary Examiner*—Aung S. Moe
*Assistant Examiner*—Vincent Rudolph
(74) *Attorney, Agent, or Firm*—Dickstein Shapiro LLP

(57) ABSTRACT

A document-management apparatus includes a displaying unit which displays both document information managed by a document-management server and image-forming-job information managed by an image-forming-job management server on an operation screen. A first unit performs an image-forming preparation of a specific document contained in the document information according to a transfer request inputted on the operation screen to transfer the specific document from the document-management server to the image-forming-job management server. A second unit outputs a specific image-forming job contained in the image-forming-job information, from the image-forming-job management server to an image-forming device according to an image-forming request inputted on the operation screen with respect to the specific image-forming job.

14 Claims, 23 Drawing Sheets

```
┌─────────────────────────────┐
│      SETTING VALUES         │
├─────────────────────────────┤
│ PAPER=A4                    │
│ LAYOUT=PORTRAIT             │
│ DUPLEX=NONE                 │
│ NUP=2IN1P1                  │
│ PUNCH=LEFT,                 │
│ STAPLE=NONE                 │
└─────────────────────────────┘
```

FIG.18

| SETTING VALUES | ACTUAL SIZE |
|---|---|
| PAPER=A4 | 298mm × 210mm |
| LAYOUT=PORTRAIT | |

FIG.19

| SETTING VALUES | PREVIEW INFORMATION | |
|---|---|---|
| NUP=2IN1P1 | SHEET ROTATION | NEEDED |
| | PAGES ON ONE SIDE | 2 |
| | IMAGE POSITION | LAYOUT=PORTRA<br>LEFT HALF: (2n-1)th PAGE<br>RIGHT HALF: (2n)th PAGE<br>LAYOUT=LANDSCAPE<br>UP HALF: (2n-1)th PAGE<br>DN HALF: (2n)th PAGE |
| | IMAGE ON BACK SIDE | NO CHANGE |
| | ADDITIONAL IMAGE | NONE |

| SETTING VALUES | PREVIEW INFORMATION | |
|---|---|---|
| PUNCH=LEFT | SHEET ROTATION | NO CHANGE |
| | PAGES ON ONE SIDE | NO CHANGE |
| | IMAGE POSITION | NO CHANGE |
| | IMAGE ON BACK SIDE | NO CHANGE |
| | ADDITIONAL IMAGE | NEEDED IMAGE DATA  POSITION: LEFT EDGE 5mm  UP/DN CENTERING |

FIG.22

| SETTING VALUES |
|---|
| PAPER=A4<br>LAYOUT=PORTRAIT<br>DUPLEX=LEFT<br>NUP=NONE<br>PUNCH=NONE<br>STAPLE=NONE |

FIG.23

| SETTING VALUES | | PREVIEW INFORMATION |
|---|---|---|
| DUPLEX=LEFT | SHEET ROTATION | NO CHANGE |
| | PAGES ON ONE SIDE | NO CHANGE |
| | IMAGE POSITION | NO CHANGE |
| | IMAGE ON BACK SIDE | NEEDED |
| | ADDITIONAL IMAGE | NONE |

DOCUMENT-MANAGEMENT PRINTING SYSTEM HAVING A DISPLAYING UNIT, AND ITS CONTROL METHOD

BACKGROUND OF THE INVENTION

1. Field of the Invention

The present invention generally relates to a document-management system and its control method which manages document files containing recorded characters, images, tables, etc., and more particularly to a document-management system and its control method which has the feature in the processing at the time of carrying out image formation and outputting the contents of the selected document.

2. Description of the Related Art

Conventionally, a document-management system which manages document files containing recorded characters, images, tables, etc., is known. Such document-management system is constituted by a document-management server, a document-management client, an image-forming-job management server, and an image-forming device. With these devices, the document-management system is capable of performing various processings of editing, movement, deletion, and printing (image formation) to the documents stored in the document-management server according to a request which is sent from the document-management client.

When the document printing is performed in the document-management system, the file of the document which should be printed is selected on the operation screen of the document-management client indicating the document-management server, and the printing request to print the document file is sent. Then, the document file is converted into an intermediate file for printing, and this intermediate file is transmitted to the image-forming-job management server. The image-forming-job management server assigns the image-forming job to an appropriate image-forming device, and the printing of the intermediate file is carried out by the image-forming device. In the above-mentioned document-management system, the printing of a single file is usually performed at a time. Alternatively, the printing of multiple files may be performed at a time. Japanese Laid-Open Patent Application No. 2000-168166 discloses such a printing system which is capable of performing the printing of multiple files at a time.

Moreover, Japanese Laid-Open Patent Application No. 2001-125757 discloses a printing system which is capable of converting two or more printing jobs, which are stacked in the printer, into a new single print job in accordance with instructions sent from the host device.

According to the printing systems described above, there is the advantage that a plurality of document files created by different application programs can be collectively printed out as a single document file. In the case of the printing system of Japanese Laid-Open Patent Application No. 2001-125757, the setting of the number of copies, the setting of the post-processing conditions, and the arrangement of the pages can also be modified to the document files after the printing request is sent.

However, in the case of the printing system of Japanese Laid-Open Patent Application No. 2000-168166, the intensive printing request has to be specified, in advance, at the time of sending the printing request. Moreover, in the case of the printing system of Japanese Laid-Open Patent Application No. 2001-125757, the modification to the document files after the sending of the printing request must be performed on the special editing menu that is separate from the printing request menu. Therefore, the operability of the conventional printing systems is not adequate for the operator to easily instruct the image formation and image output processing of the documents managed in the document-management system.

SUMMARY OF THE INVENTION

An object of the present invention is to provide an improved document-management apparatus and control method in which the above-described problems are eliminated.

Another object of the present invention is to provide a document-management apparatus which improves the operability of image formation and image output processing of the documents managed by the document-management system.

Another object of the present invention is to provide a document management control method which improves the operability of image formation and image output processing of the documents managed by the document-management system.

The above-mentioned objects of the present invention are achieved by a document-management apparatus comprising: a displaying unit displaying both document information managed by a document-management server and image-forming-job information managed by an image-forming-job management server on an operation screen; a first unit performing an image-forming preparation of a specific document contained in the document information according to a transfer request inputted on the operation screen to transfer the specific document from the document-management server to the image-forming-job management server; and a second unit outputting a specific image-forming job, contained in the image-forming-job information, from the image-forming-job management server to an image-forming device according to an image-forming request inputted on the operation screen with respect to the specific image-forming job.

The above-mentioned objects of the present invention are achieved by a document-management control method comprising the steps of: displaying both document information managed by a document-management server and image-forming-job information managed by an image-forming-job management server on an operation screen; performing an image-forming preparation of a specific document, contained in the document information according to a transfer request inputted on the operation screen to transfer the specific document from the document-management server to the image-forming-job management server; and outputting a specific image-forming job, contained in the image-forming-job information, from the image-forming-job management server to an image-forming device according to an image-forming request inputted on the operation screen with respect to the specific image-forming job.

The above-mentioned objects of the present invention are achieved by a document-management apparatus comprising: a printing execution unit receiving a printing intermediate data recorded in a storage device, adding a print setting command to the printing intermediate data, and outputting the printing intermediate data with the print setting command to a printer driver, so that an image forming device is caused to perform printing of the printing intermediate data based on the print setting command; and a displaying unit generating a print setting data including print setting items in consideration of finishing functions, converting the printing intermediate data into drawing data, and processing the drawing data based on the generated print setting data, so that the processed drawing data is displayed on an operation screen as an output image form.

The above-mentioned objects of the present invention are achieved by a document-management control method comprising the steps of: receiving a printing intermediate data recorded in a storage device, adding a print setting command to the printing intermediate data, and outputting the printing intermediate data with the print setting command to a printer driver, so that an image forming device is caused to perform printing of the printing intermediate data based on the print setting command; and generating a print setting data including print setting items in consideration of finishing functions, converting the printing intermediate data into drawing data, and processing the drawing data based on the generated print setting data, so that the processed drawing data is displayed on an operation screen as an output image form.

According to the document-management apparatus and control method of the preferred embodiment of the invention, the document handling operations including the image-forming job operation and the image output instruction can be easily performed on the same operation screen. The operability of image formation and image output processing of the documents managed by the document management system can be remarkably improved.

Since the information managed by the image-forming-job management server is displayed on the operation screen, similar to making reference to the list of the documents stored in the document-management server, making reference to the list of the image-forming jobs can be performed. This makes it possible that the operator can grasp visually what image-forming jobs are included by using the information displayed on the operation screen.

The contents of the intermediate file are displayed per page on the operation screen by using the viewer in accordance with the instructions from the operator, and the flexibility of the image formation output can be improved. Moreover, since it becomes unnecessary to open and edit the intermediate file for every document when handling the one-page of the document, the operability can also be increased.

According to the document-management apparatus and control method of the preferred embodiment of the invention, the printing is carried out by generating the printing data as an intermediate data by the printer driver and processing the intermediate data to develop the image drawing data.

According to the document management apparatus and control method of the preferred embodiment of the invention, the print setting data in consideration of the finishing functions is generated, and the processed drawing data is created based on the print setting items of the generated print setting data for the actual output form. Therefore, the preview display in consideration of the finishing functions, such as the combined printing, the staple and the punch of the print setting, can be performed.

BRIEF DESCRIPTION OF THE DRAWINGS

Other objects, features and advantages of the present invention will be apparent from the following detailed description when read in conjunction with the accompanying drawings.

FIG. 13 is a diagram showing an example of the print setting screen on which the operator performs the print setting operation.

FIG. 17 is a diagram showing the print setting command at the time of the print setting screen of FIG. 16.

FIG. 18 is a diagram showing the print setting command.

FIG. 19 is a diagram showing the preview information in the case of the combined printing.

FIG. 22 is a diagram showing the print setting command at the time of the print setting screen of FIG. 21.

FIG. 23 is a diagram showing the preview information at the time of the print setting screen of FIG. 21.

DETAILED DESCRIPTION OF PREFERRED EMBODIMENTS

A description will now be provided of the preferred embodiments of the present invention with reference to the accompanying drawings.

First, the document-management system and its control method of the first preferred embodiment of the invention will be explained by using FIG. 1 through FIG. 10.

Figure 2:
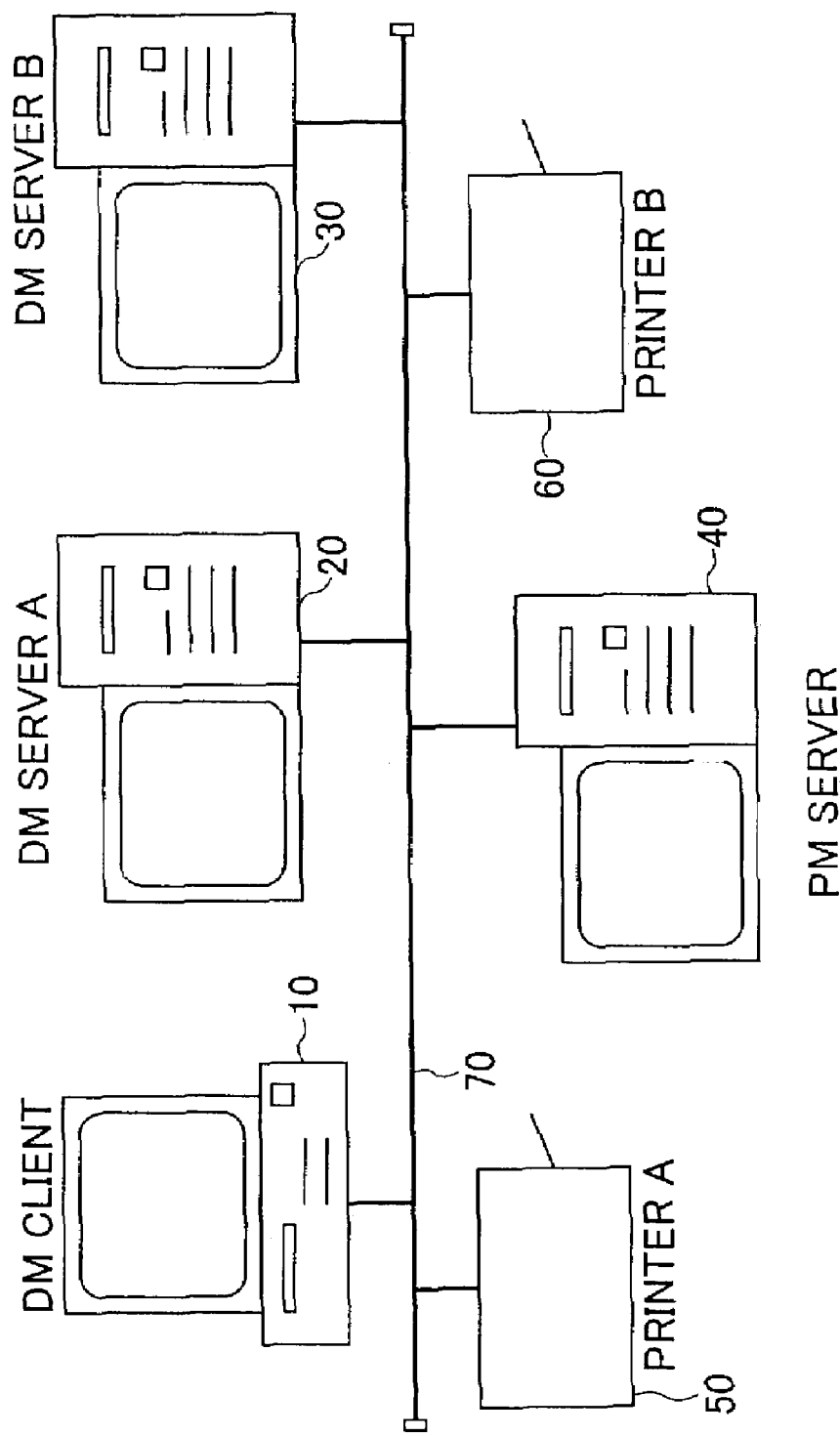
FIG. 2 is a diagram showing the document-management system of the first preferred embodiment of the present invention.

FIG. 2 shows the document-management system of the first preferred embodiment of the invention.

The document-management system of the present embodiment comprises the document-management (DM) client 10, the first document-management (DM) server (DM server-A) 20, the second document-management (DM) server (DM server-B) 30, the printing job management (PM) server 40 that is the image-forming-job management server, the first printer (printer A) 50, and the second printer (printer B) 60, which are connected to the network 70.

It is possible to perform various processings (operation) of edit, movement, deletion, printing (image formation), etc. by operation from the document-management client 10 to the documents, such as recorded characters, images or tables in the document-management servers 20 and 30.

Among these, the printing job management server 40 which stores the printer driver of each printers 50 and 60 manages the printing job, distributes the job to each printers 50 and 60 according to instructions of printing, and makes printing based on the data of the document stored in the document-management servers 20 and 30 by the printer driver perform about printing.

What installed the software of exclusive use in the well-known personal computer (PC) as these document-management clients 10, the first, the second document-management server 20 and 30, and a printing job management server 40 can be used.

It is possible to use the computer by the hardware of exclusive use which is suitable for the function explained below.

Moreover, the well-known printer can be used as the first and the second printer 50 and 60, and the digital compound machine equipped with the print function etc. may be used.

Figure 3:
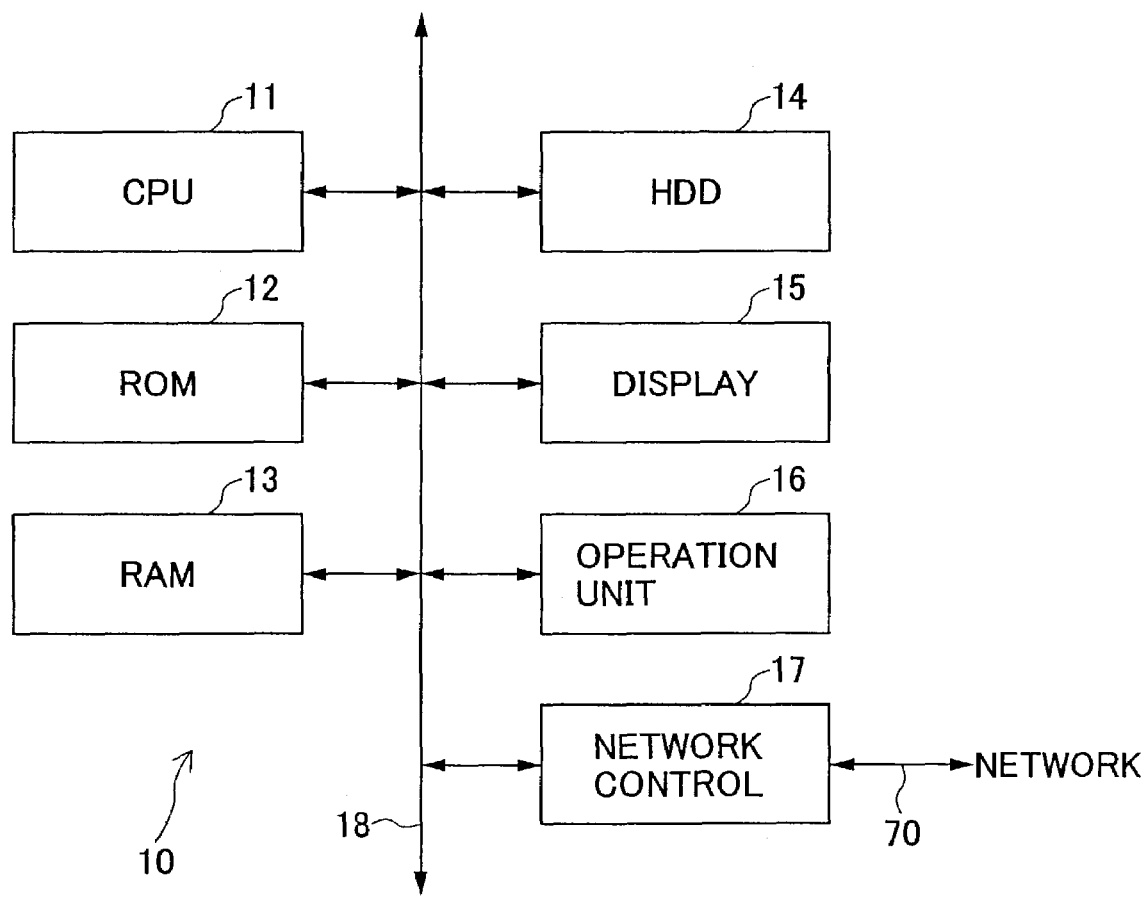
FIG. 3 is a block diagram of a document-management client of FIG. 2.

FIG. 3 shows the document-management client 10 of FIG. 2.

The document-management client 10 of the present embodiment is constituted by a personal computer (PC). As shown in FIG. 3, the document-management client 10 comprises a CPU 11, a ROM 12, a RAM 13, a hard disk drive (HDD) 14, a display 15, a operation unit 16 and a network control unit 17, which are interconnected by the system bus 18.

The CPU 11 is a control unit which controls the entire document-management client 10. The CPU 11 executes various control programs and application programs which are read from the ROM 12 or the HDD 14, and carries out the transfer of the information between the respective devices of the document-management system, the control of each device, the editing of the data in the document-management system, and the instructions to the respective devices.

The ROM 12 is a storage device that mainly stores the control program of the document-management apparatus. The RAM 13 is a storage device that is used for the work memory and the temporary data storage of the CPU 11.

The HDD 14 is a storage device that mainly stores various application programs which need the upgrading frequently. When using the document-management client 10 for another purpose, the HDD 14 also stores the various files depending on the use.

However, when the ROM 12 is used to store the application program or when the reading from the document-management server 20 or 30 is possible, the HDD 14 may not be provided in the document-management client 10.

The display 15 is a display unit which may include a liquid crystal display or a cathode-ray tube (CRT) monitor. The operation screen on the display 15 is the interface to the operator for the application program, and operations and instructions which are inputted to the operation screen on the display 15 are received, and the result is also displayed on the operation screen.

The operation unit 16 comprises the keyboard, the mouse, etc. and the operator performs operations and instructions by using the operation unit 16 directly.

The network control unit 17 is the interface with the network 70 where the document-management client 10 is connected.

Although the computer that is the same as the document-management servers 20 and 30 or the printing job management server 40 can be used, the document-management servers 20 and 30 require the use of a storage device such as a mass HDD for storing a large amount of document data.

Moreover, if all the operations and instructions are performed by the document-management client 10 and the printing job management server 40 only, it is not necessary to provide the display 15 and the operation unit 16.

Next, a description will be given of operation of the document-management application program of the document-management client 10 which serves as a document-management means for performing operation to the documents managed by the document-management servers 20 and 30.

In addition, the document-management application program displays the information on the documents managed by the document-management server and the information on the printing job management server on the same operation screen. The features of the present invention are that the operation to the printing job related to the document-management server and the printing job management server is possible on the operation screen.

Moreover, in performing the application program by the operating system equipped with the multi-window function, the operation screen is considered as a single window of the display 15, not the whole screen of the display 15.

The document-management application program is a kind of the application program mentioned above, and it is stored in the HDD 14, the ROM 12 or the document-management server 20 or 30. According to the starting instruction from the operator, the CPU 11 reads it therefrom and it is loaded to the RAM 13.

Figure 1:
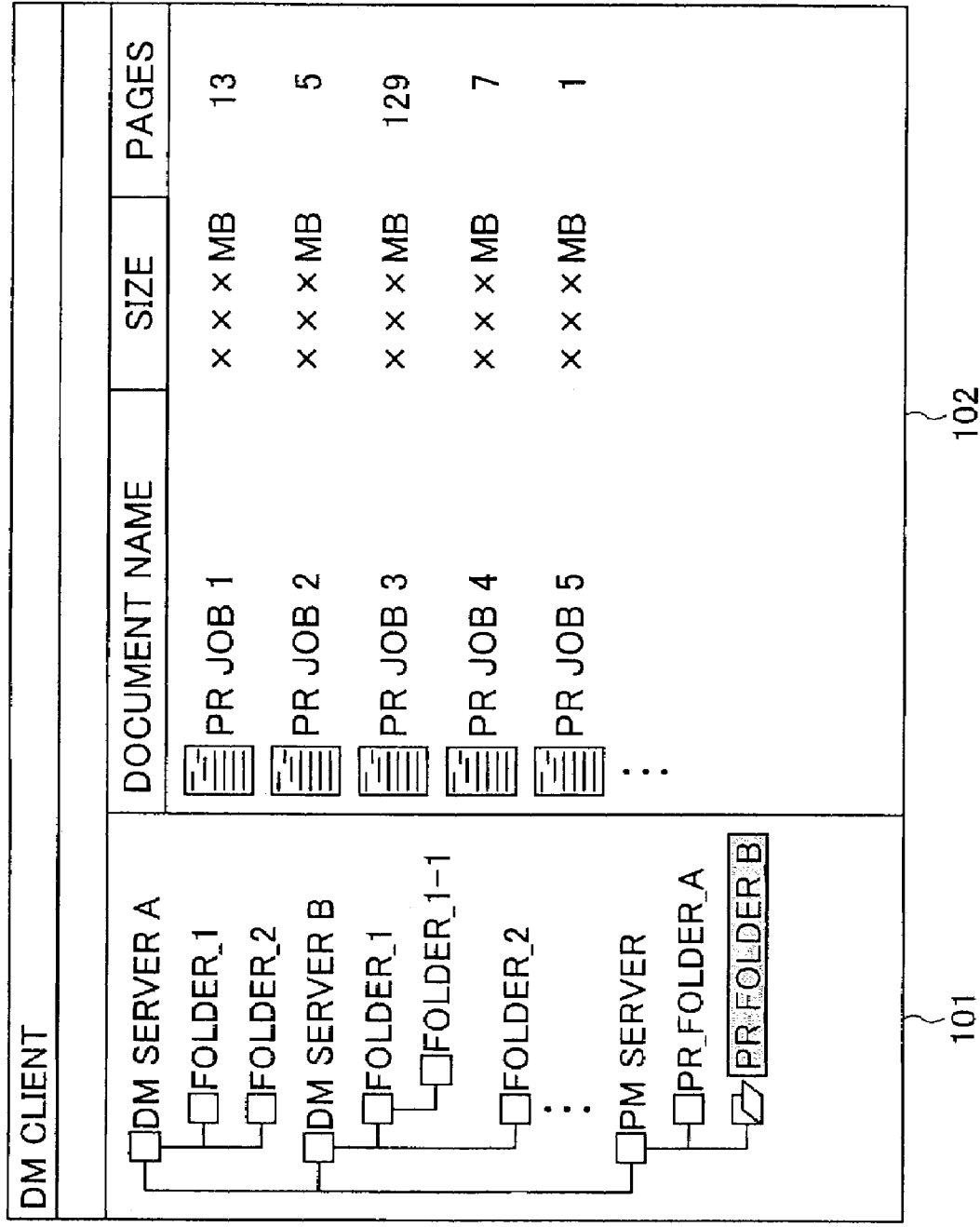
FIG. 1 is a diagram showing an example of the operation screen of a document-management application in a document-management system of a first preferred embodiment of the present invention.

FIG. 1 shows an example of the operation screen of the document-management application program.

The operation screen by the document-management application program includes the tree display 101 and the list display 102 as shown in FIG. 1. The list display 102 indicates the contents of the folder chosen among the folders which show the information on the folder in the document-management server and the printing job management server displayed in the tree form by the tree display 101.

The example which displays the folders of the document-management server-A 20, the document-management server-B 30, and the printing job management server 40 is shown in FIG. 1.

In addition, the printer folder corresponding to the printer connected to the document-management system is displayed on the bottom of the printing job management server 40.

In the example shown in FIG. 1, the printer folder-A corresponding to the printer-A 50 and the printer folder-B corresponding to the printer-B 60 are displayed.

In such an operation screen, the operator chooses the folder which stores the document and displays on the list display 102 the information on the document which is the contents to carry out the printout of the document.

Then, the printing demand is inputted by drags and drops to the printer folder corresponding to the printer using for printing under the printing job management server which chose the document to print with the mouse of the operation unit 16, and was displayed on the tree display 101, and performing operation of movement or the copy.

Figure 4:
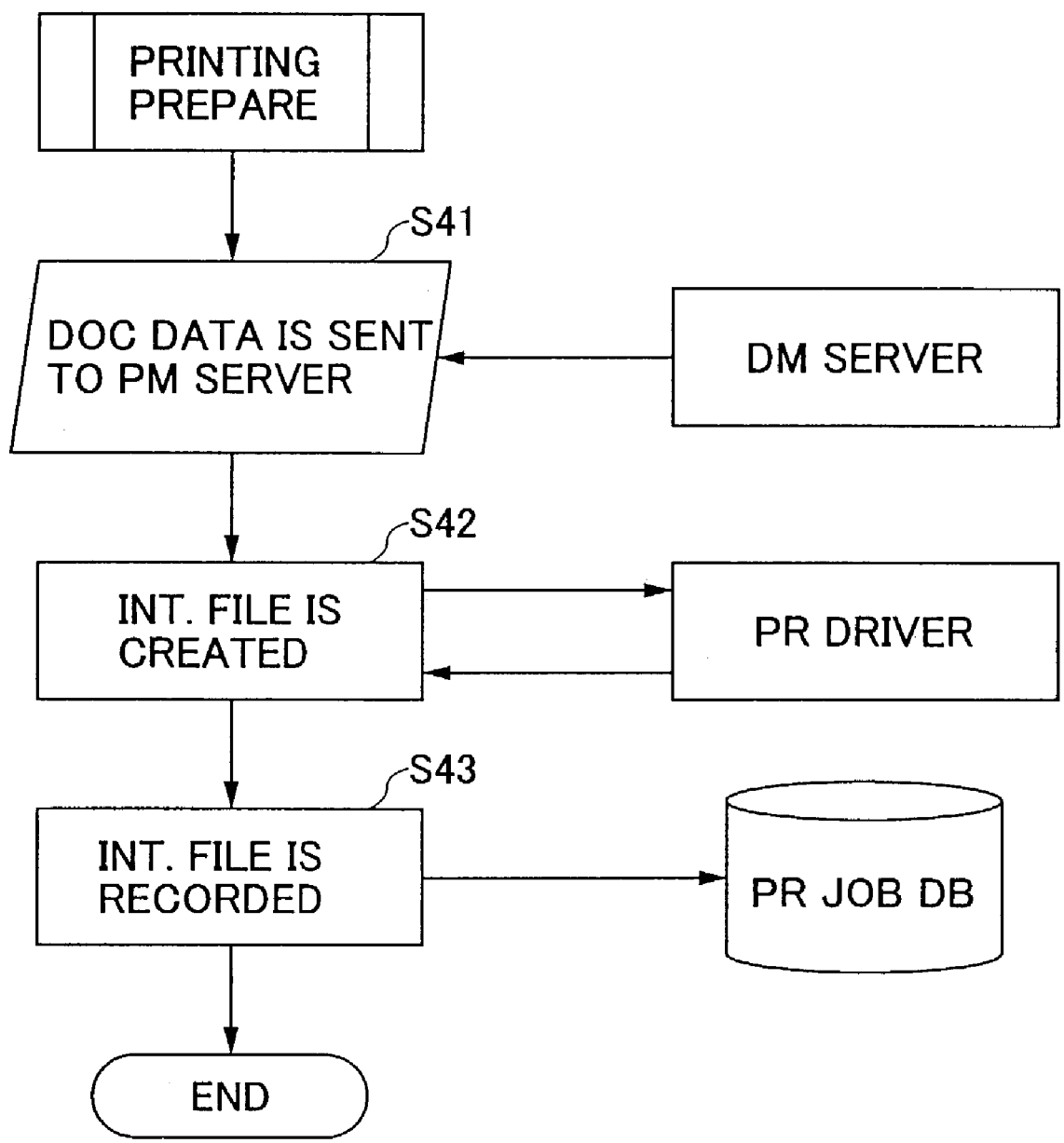
FIG. 4 is a flowchart for explaining the processing of printing preparation which is executed by the document-management client of FIG. 2.

FIG. 4 shows the processing of printing preparation which is executed by the document-management client 10 of FIG. 2.

When the operation is performed, the document-management client 10 will start the processing shown in FIG. 4.

First, the document-management application program directs to send the data of the document to the printing job management server to the document-management server which stores the data of the selected document as instructions of printing preparation (S41).

In the printing job management server, when the data of the document is sent, the printer driver of the printer corresponding to the dropped printer folder is called, and the document-management client 10 generates the intermediate file for printing automatically from the data of the received document (S42).

The document-management client 10 stores and manages the intermediate file by making the intermediate file into the printing job to the printer folder which is the printing-job database (DB) (S43).

The management is performed according to the instructions from the document-management application program.

Moreover, when the printer folder is chosen by the tree display 101 of the display screen of the document-management application program, the intermediate file stored as the contents is indicated by the list at the list display 102.

In the example of FIG. 1, the state in which the contents of the printer folder B are displayed.

Figure 5:
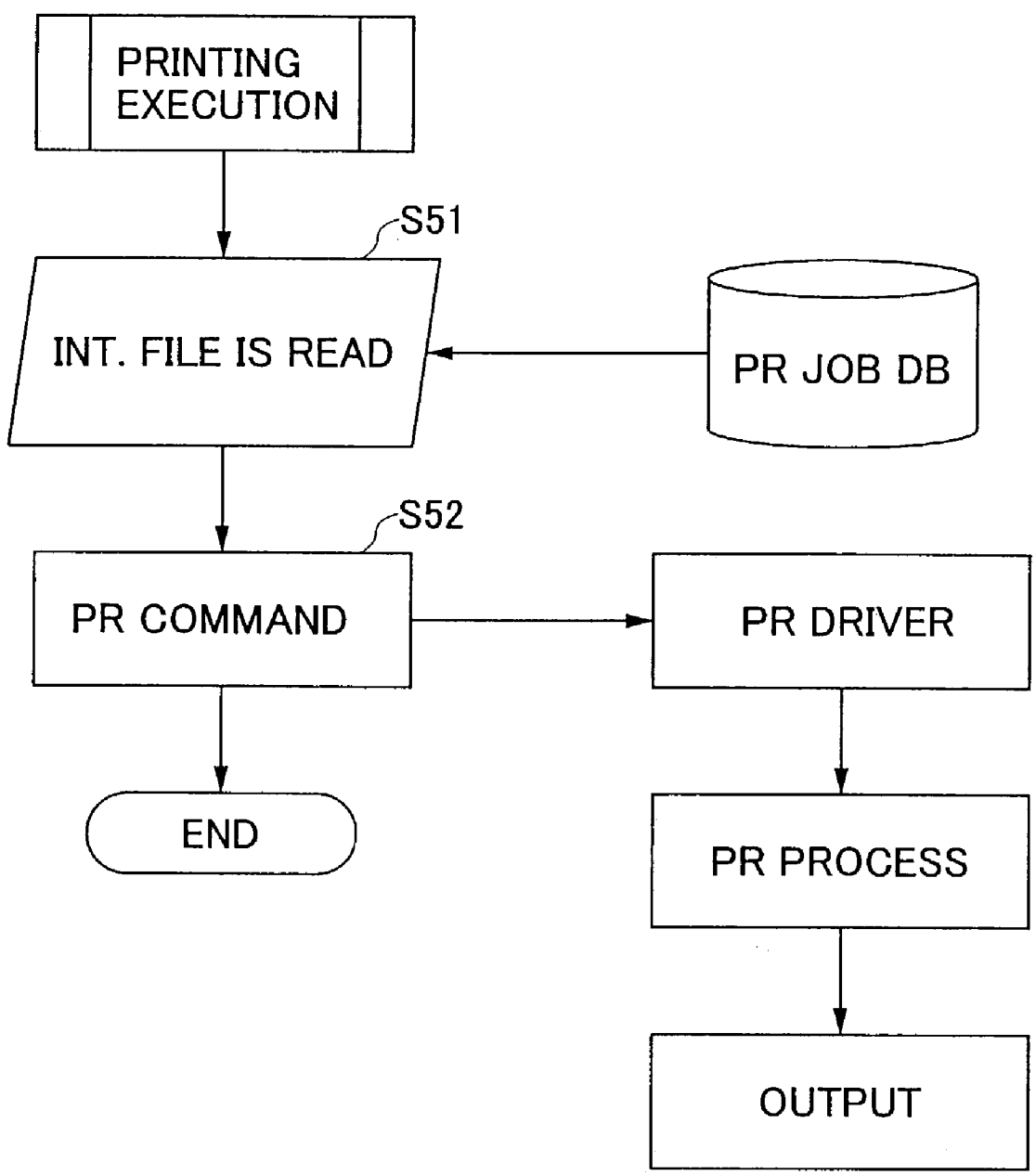
FIG. 5 is a flowchart for explaining the processing of printing execution which is executed by the document-management client of FIG. 2.

FIG. 5 shows the processing of printing execution which is performed by the document-management client 10 of FIG. 2.

When there is the instruction of printing from the operator by the operation unit 16 to the printing job by which it is indicated- by the list, the document-management client 10 will start the processing shown in FIG. 5.

First, document-management application starts the printer driver corresponding to the printer folder the printing job is remembered to be as instructions of printing execution to the printing job management server, and it directs to deliver the intermediate file which is the printing job with printing instructions (S51).

The printer driver drives the printer based on the data of the intermediate file delivered according to these instructions, and carries out the printout of the contents of the document (S52).

Moreover, before printing, operation of combination or deletion can also be performed to the printing job.

Figure 6:
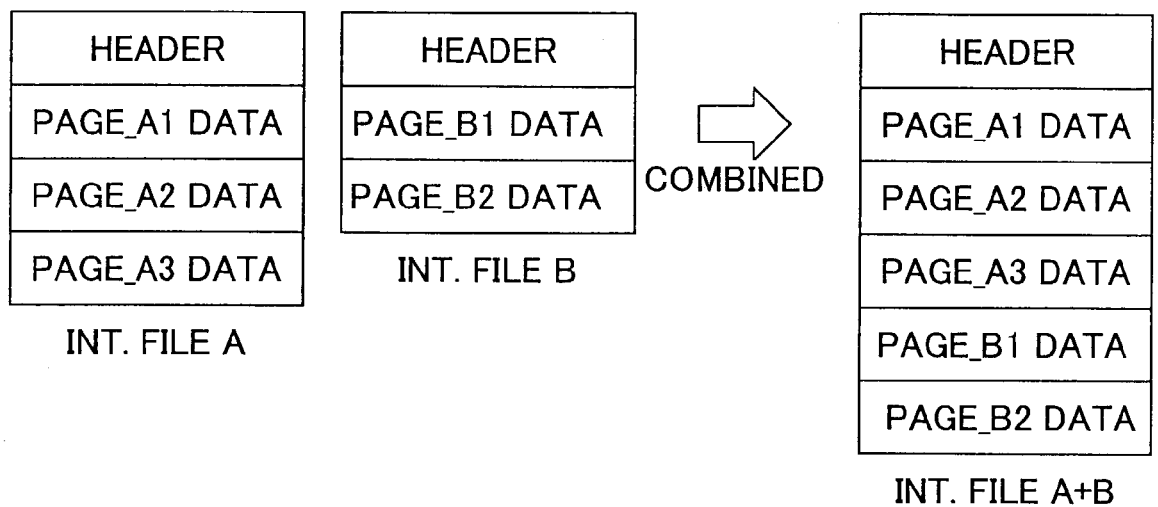
FIG. 6 is a diagram showing the processing of intermediate-file combination which is executed by the document-management client of FIG. 2.

FIG. 6 shows the processing of intermediate-file combination which is performed the document-management client 10 of FIG. 2.

For example, when the operator chooses intermediate-file A and intermediate-file B from the list of the intermediate files displayed on the list display 102 and the combination is directed, it will point to the document-management application program so that these intermediate files may be combined and the new intermediate file may be generated to the printing job management server, and the printing job management server will generate the new intermediate-file (A+B), as shown in FIG. 6 according to the instruction.

By directing the printing of the intermediate-file (A+B), the file A which is the basis of the intermediate-file A, and the file B which is the basis of the intermediate-file B can be printed as one printing job.

Also, when the deletion of the intermediate file is directed by the operator with the instruction from the document application according to this, the printing job management server can delete the intermediate file, and the printing can be stopped. In this case, it is also possible to choose and delete multiple files simultaneously.

The document-management system of the present embodiment can carry out the printout of the contents of the document managed by the document-management server by the above processings according to instructions of the operator by using the printer.

Thus, since even from operation of the document to operation of the printing job and instructions of printing can be consistently performed on the same operation screen by constituting and controlling the document-management system, operation of the printing job and instructions of printing can be easily carried out now, and the operability about image formation output instructions of the document can be improved.

Moreover, since the information on the printing job management server was also displayed on the operation screen of document-management application, the same with referring to the list of the document stored in the document-management server, the list of printing jobs also becomes referred to, and it can grasp visually what printing job exists easily.

This document-management system can generate the image data of each page from the intermediate file using the printer driver, and can also display it per page by the exclusive viewer which stores the image in the HDD 14, the ROM 12 or the document-management server 20 or 30.

Figure 7:
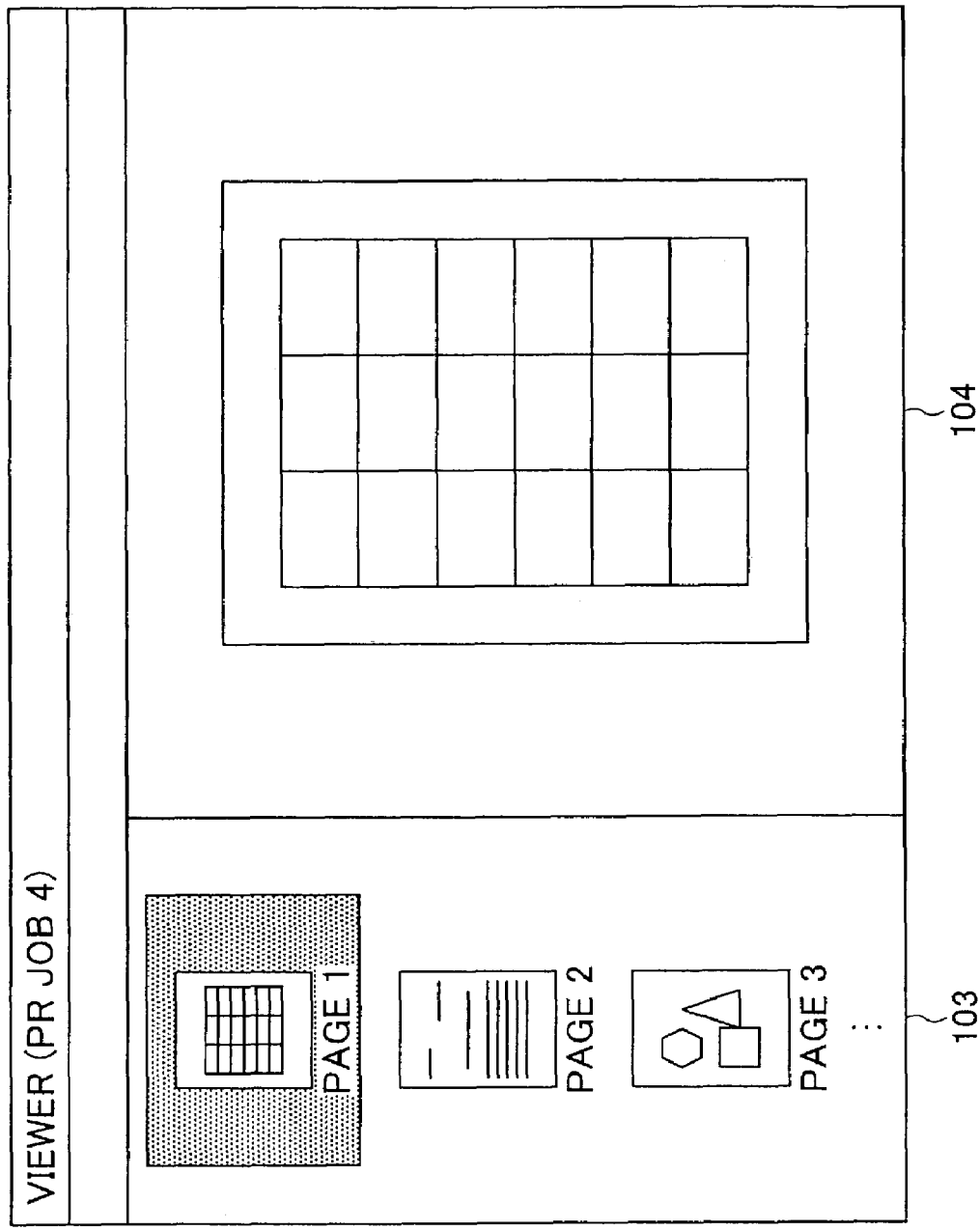
FIG. 7 is a diagram showing an example of the operation screen of the viewer which is used by the document-management application program of the first preferred embodiment of the present invention.
Figure 8:
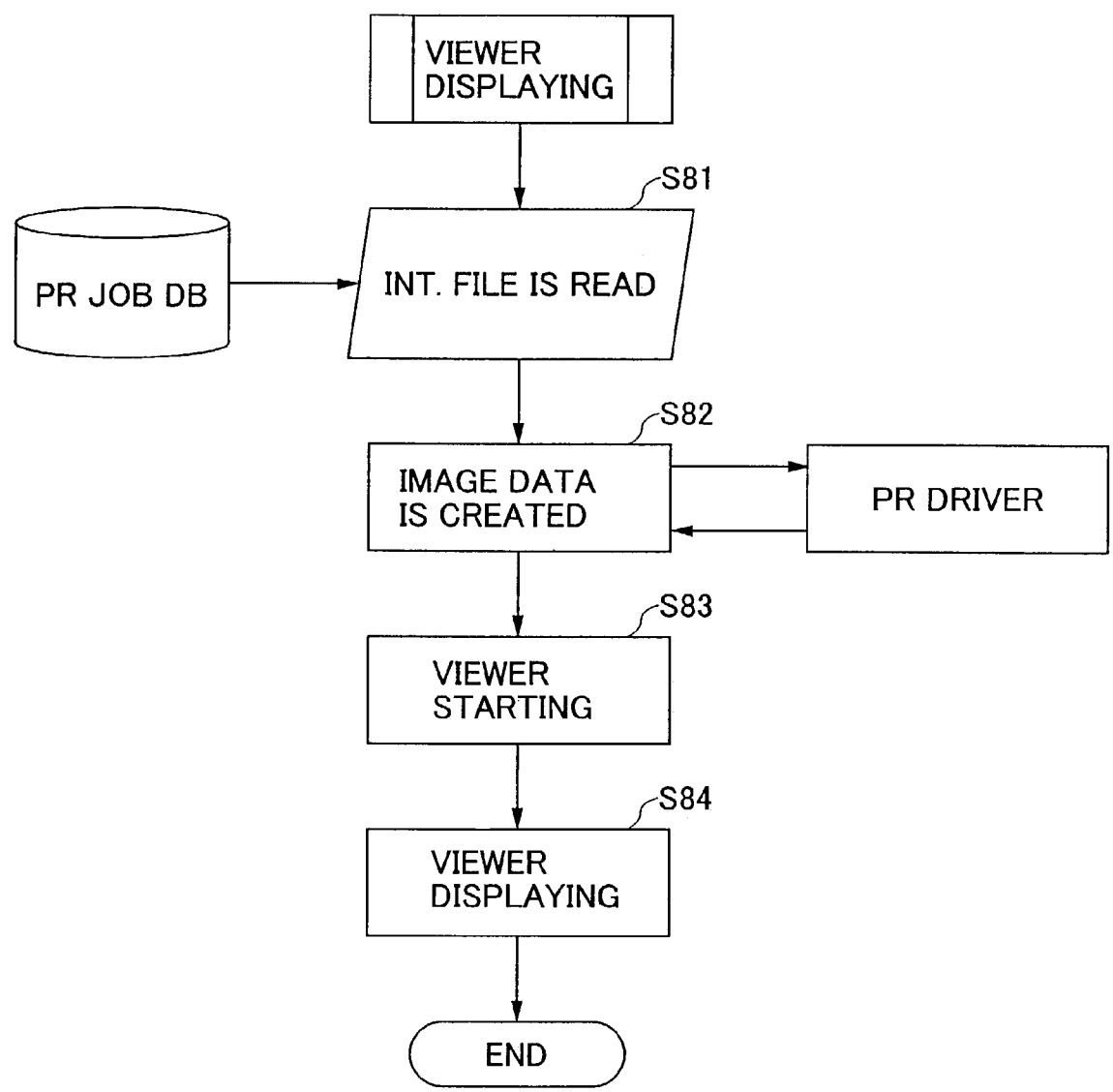
FIG. 8 is a flowchart for explaining the processing of viewer displaying which is executed by the document-management client of FIG. 2.

FIG. 7 shows an example of the display screen of the exclusive viewer used in this document-management application. FIG. 8 shows processing of the viewer display which the document-management client 10 of FIG. 2 performs.

The display is performed when there are instructions of the display by the exclusive viewer from the operator to either of the printing jobs which indicated by the list.

That is, if there are selection of the printing job and instructions of the display by the exclusive viewer from the operator, the document-management client 10 will start the processing shown in FIG. 8.

First, the acquisition of the image data from the printing job (intermediate file) as which document-management application is chosen to the printing job management server as instructions of the display by the viewer is directed (S81).

The printing job management server generates the image data by the printer driver according to these instructions (S82).

Document-management application starts the exclusive viewer after that (S83).

The document-management client 10 receives the generated image data, and displays the image on the operation screen (S84).

In the display screen of this exclusive viewer, as shown, for example in FIG. 7, it divides and displays on the page list display 103 which displays the reduction image (thumbnail) of each page of the intermediate file which should be displayed, and the selection page display 104 which displays the image of the page chosen from the page list display 103.

FIG. 7 shows the example which displayed the "printing job 4" shown in FIG. 1, and displayed the image of the "page 1" chosen by the page list display 103 on the selection page display 104.

In addition, it may express only as the reduction image or you may make it display the 1 page of images at a time according to instructions of the operator.

Here, the reduction image is generable by thinning out the line from the image data once generated, for example.

In addition, when performing application by the operating system equipped with the multi-window function, as for the display screen of this exclusive viewer, it is good to make it display on the window different from the operation screen of document-management application.

Since the operator can check as a image the contents of the intermediate file which is the file of the form which cannot usually be checked by using such an exclusive viewer, convenience can be raised more.

In addition, although explained that the viewer was the thing of exclusive use here, if the function explained here is realizable, it is also possible to use the general-purpose viewer which is not the thing of exclusive use.

According to such a viewer, instructions of the operation for every page to the intermediate file can be attained, and movement of the page inside the one intermediate file, deletion, copy, etc. can be operated.

Moreover, operation of division of the intermediate file can also be performed.

Figure 9:
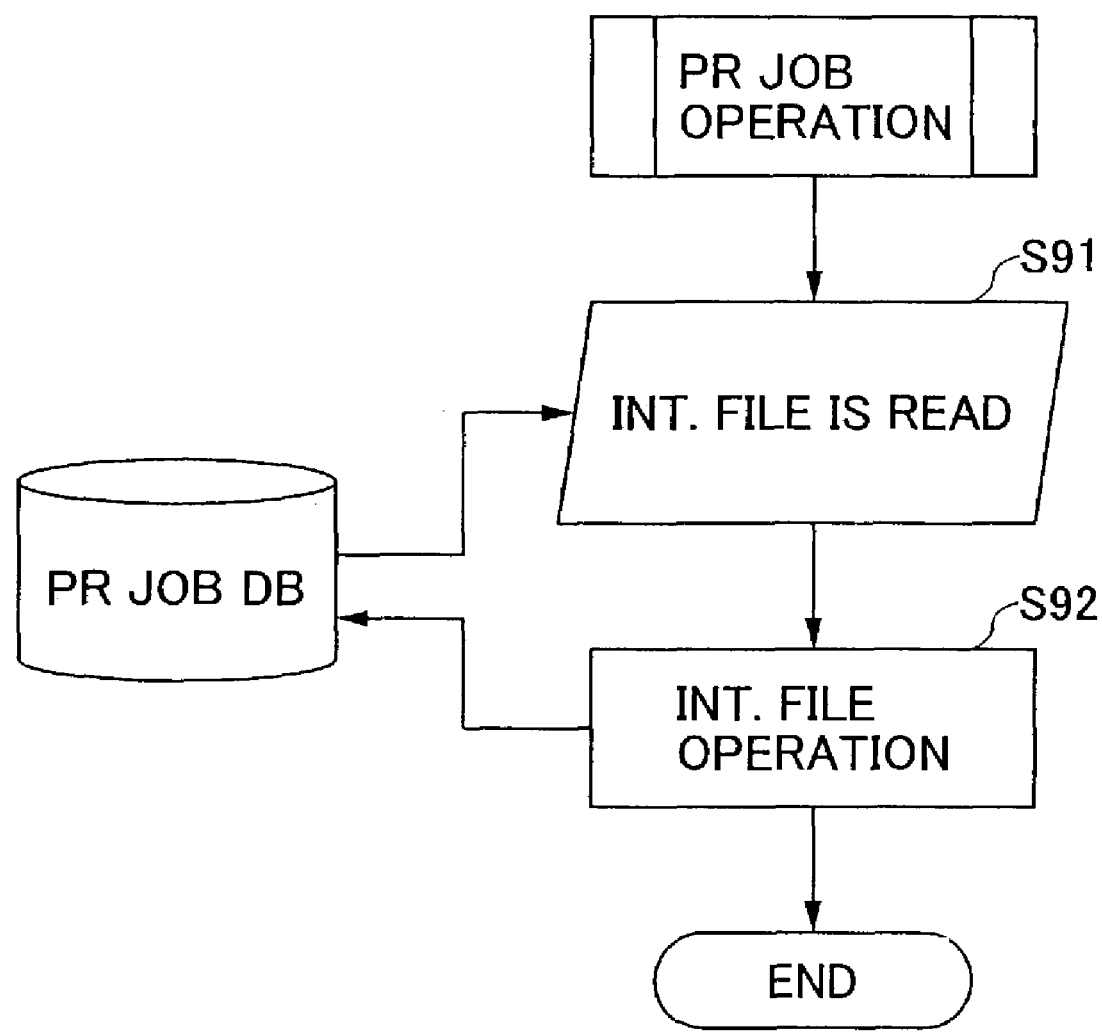
FIG. 9 is a flowchart for explaining the processing of printing job operation which is executed by the document-management client of FIG. 2.

FIG. 9 shows the processing of printing job operation which is performed by the document-management client 10 of FIG. 2.

For example, when the page of the division position is specified from the list of the pages which were made to display the contents of the intermediate file which the operator wants to divide by the viewer in division, and were displayed on the page list display 103 and division is directed, this document-management client 10 will start the processing shown in FIG. 9.

First, it points so that document-management application may divide to the printing job management server in the position which had the selected intermediate file specified and may generate the new intermediate file, and the printing job management server reads the intermediate file chosen from the printing job DB according to these instructions (S91).

The one file can be printed as two printing jobs by the document-management client's 10 generating the new intermediate file, registering it into the printing job DB again, and directing printing to this intermediate file (S92).

If the page to operate from the list of the pages which were made to display the contents of the intermediate file which the operator wants to operate by the viewer in page operation, and were displayed on the page list display 103 is specified and movement, deletion, copy, etc. are directed, the printing job management server will generate the intermediate file of the state after operation with the instructions from document-management application like the case of division.

Figure 10:
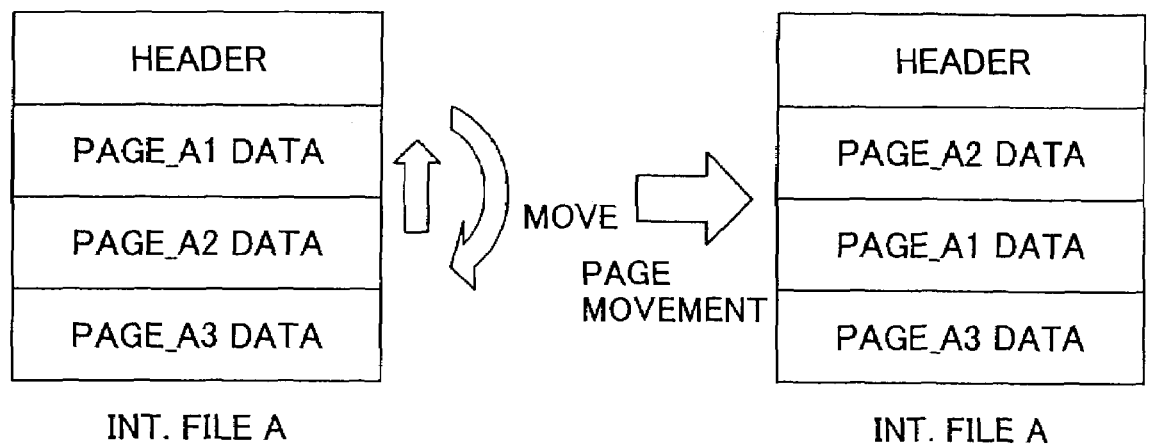
FIG. 10 is a diagram for explaining the printing job operation.

FIG. 10 is a diagram for explaining printing job operation.

For example, in page movement, if page movement is directed by drag and drop etc., the intermediate file which changed the turn of the page as shown in FIG. 10 will be generated.

FIG. 10 shows the example which performed the instructions for which the page A1 of intermediate-file A is moved behind the page A2.

The intermediate file with which the processing of deletion or copy is performed is generated similarly in deletion or copy.

Since the document handling, such as movement, deletion or copy, of the specific page can be performed on the viewer after changing it into the intermediate file, when using as the printing job the document stored in the document-management server by doing in this way, the flexibility of the printout can be improved.

Moreover, since it will become unnecessary to open and edit the file for every document if only the edit for every page becomes, operability can also be raised.

Furthermore, since the page is movable, or it enables it to delete the unnecessary page collectively by easy operation like the viewer top or drag and drop, operability can be raised also at this point.

Although the document-management client 10 is PC and the example for which the CPU 11 of the document-management client 10 performs document-management application was explained by this preferred embodiment, to the document-management client 10, the operation from the operator is only received, only the function which displays the result is given, and you may make it make operation of application etc. perform by other servers (for the document-management server and the printing job management server to be sufficient) connected to the network 70.

Although the document-management client 10, the document-management servers 20 and 30, and the printing job management server 40 explained the example which is another apparatus altogether by this preferred embodiment, the function of the document-management client is also given to each server, and you may make it serve with this.

Moreover, the number of the computers, such as the client which constitutes the document-management system, the server, and the printer, is not limited to the above-described embodiment.

Figure 11:
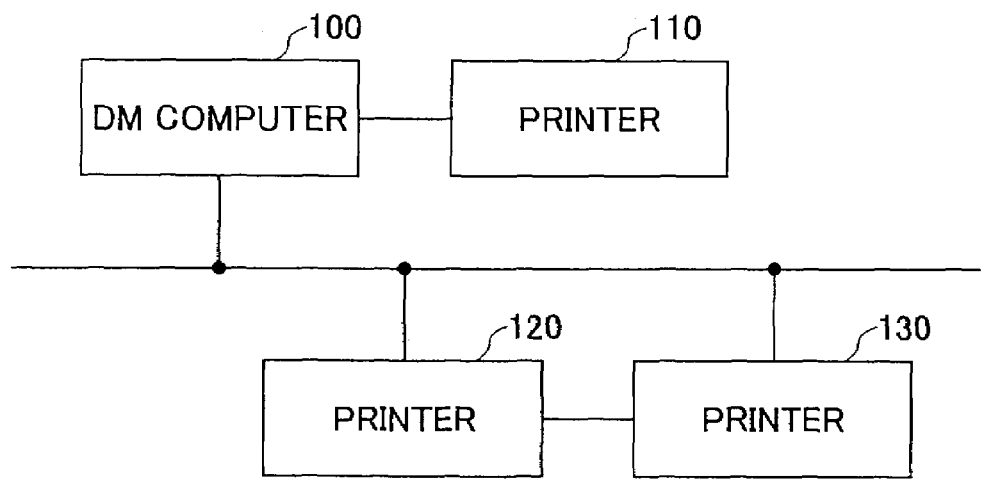
FIG. 11 is a block diagram of a document-management system of a second preferred embodiment of the present invention.

Next, FIG. 11 shows the document-management system of the second preferred embodiment of the invention.

According to the document-management system of the second preferred embodiment of the present invention, the print setting data in consideration of the finishing functions is generated, and the accumulated printing intermediate data is changed into image drawing data, and it is displayed on the operation screen based on the print setting items of the generated print setting data for the actual output form.

In FIG. 11, the document-management system of the present embodiment comprises the document-management (DM) computer 100 which is connected directly to the printers 110, 120, and 130 via the cable. Alternatively, the document-management computer 100 may be indirectly connected to the printers 110-130 through the network.

Moreover, on the document-management computer 100, printing instructions can be carried out to the printer connected through the printer driver from arbitrary applications.

Figure 12:
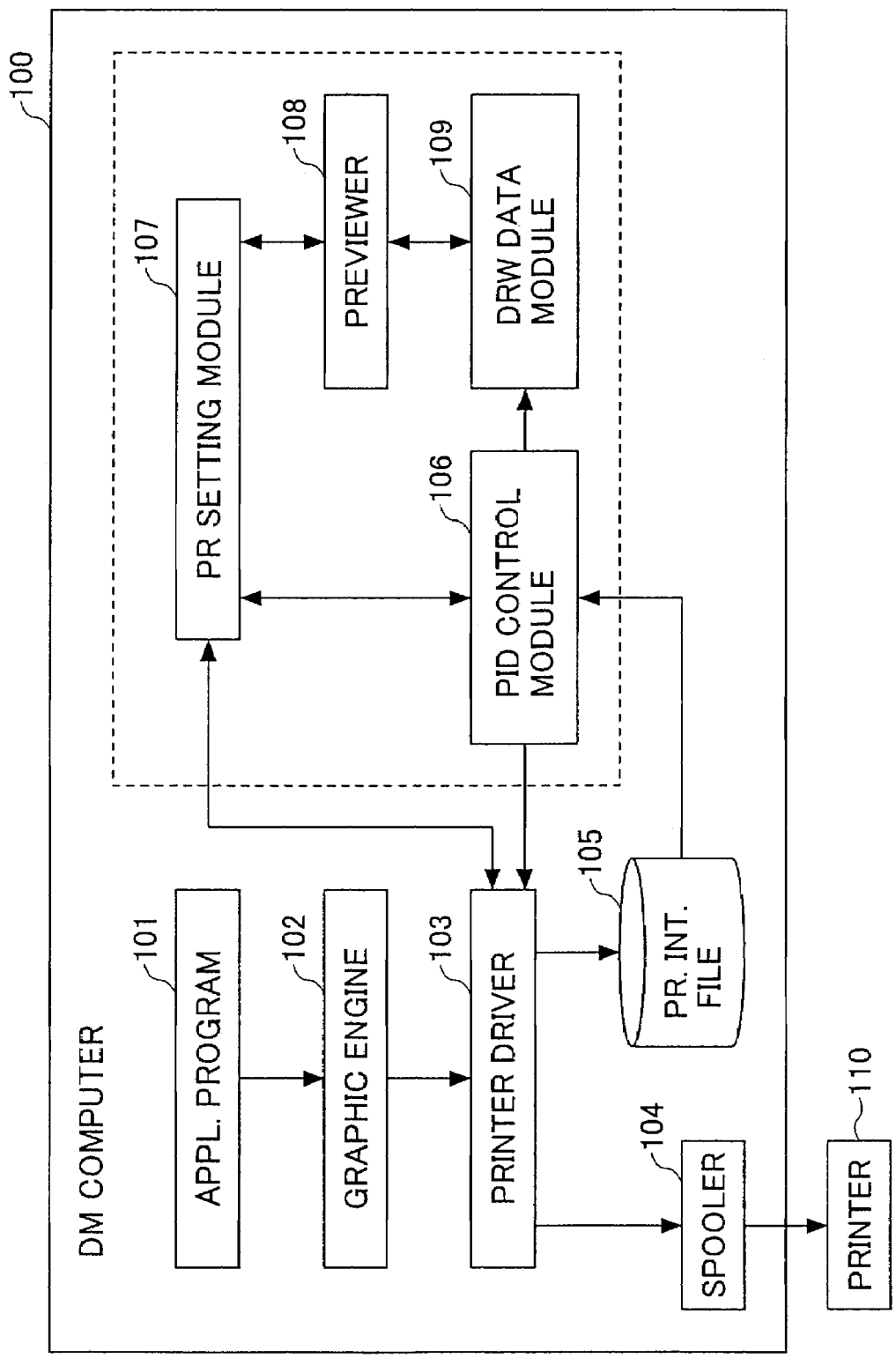
FIG. 12 is a block diagram of a document-management computer of FIG. 11.

FIG. 12 shows the composition of the document-management computer of FIG. 11.

In addition, in the document-management computer 100, the application program is operated on the operating system, such as the Windows.

As shown in FIG. 12, when the application 101 on the document-management computer 100 performs the printing, the graphics engine 102 outputs the data to the printer driver 103 by drawing the data of the application 101.

The printer driver 103 changes the drawing data into the code which can be understood to the printer, such as PDL (Page Description Language), and accumulates the data to the spooler 104.

The printing is performed when the spooler 104 transmits the data to the printer 110.

In the operating system (OS), such as the Windows, the graphics engine 102 is called the GDI (GraphicDevice Interface), and the operating system provides the function of the GDI.

Moreover, the spooler 104 is also offered by the operating system (OS).

In the document-management computer 100 of this preferred embodiment, the printer driver 103 changes the drawing data from application 101 into printing intermediate data, and accumulates the printing intermediate data as a printing intermediate file 105 to the storage apparatus of the document-management computer 100.

Moreover, by this document-management computer 100, it outputs from the printer on the set-up printing conditions to the printing data with which the plurality was accumulated by adding the print setting command to two or more accumulated printing intermediate data, and sending the data to the printer driver 103 again.

Moreover, it not only generates by the printer driver 103, but the print setting command can be generated from the external module.

In the present embodiment, the print setting module 107 receives the data from the printing intermediate data control module 106 which manages the accumulated printing intermediate data, and changes it into the image data which the previewer 108 can process and display, for example, DIB (Device Independent Bitmap), etc.

The print setting module 107 generates the print setting data without the conflict which can be printed, exchanging the information on the printer driver 103.

In addition, although this preferred embodiment is applied in the client/server system, it can be adapted on the same natural computer.

The previewer 108 performs the preview display in the form which incorporates the print setting data by using the image data derived from the printing intermediate data, and the print setting data generated by the print setting module 107.

The print setting command generated by the print setting module 107 when the operator performs the print setting and requests the printing execution is passed to the printing intermediate data control module 106.

The printing intermediate data control module 106 sends the printing intermediate data and the print setting command to the printer driver 103, so that the printing is performed.

Figure 13:
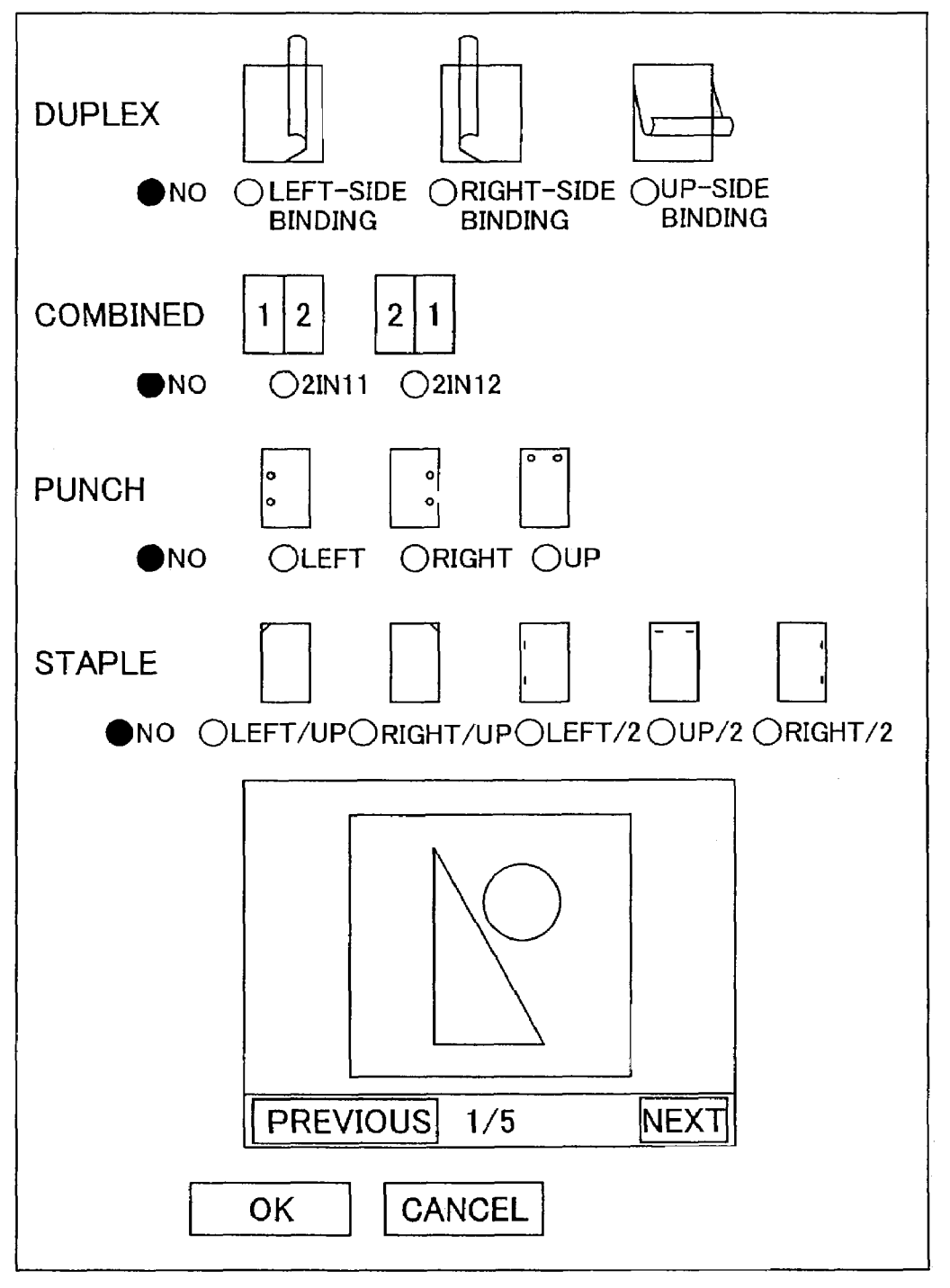

FIG. 13 shows an example of the print setting screen for the operator to perform the print setting operation.

As shown in FIG. 13, the print setting data, the print setting items which can be chosen after choosing the setting with the operator are reflected in the operation screen by the data exchange between the print setting module 107 and the printer driver 103.

On the print setting screen of FIG. 13, there is the column which displays the preview image in the form reflecting the print setting data.

The information on the page number displayed now and the total page number is displayed on the preview image bottom of this column, and the button of the "previous", the "next", etc., etc. is displayed on it.

The operator can change the page number displayed now by clicking the "previous" button and the "next" button (form turning over).

The total page number is the 5 pages and it expresses with this example that the page number displayed now is the 1 page.

Figure 14:
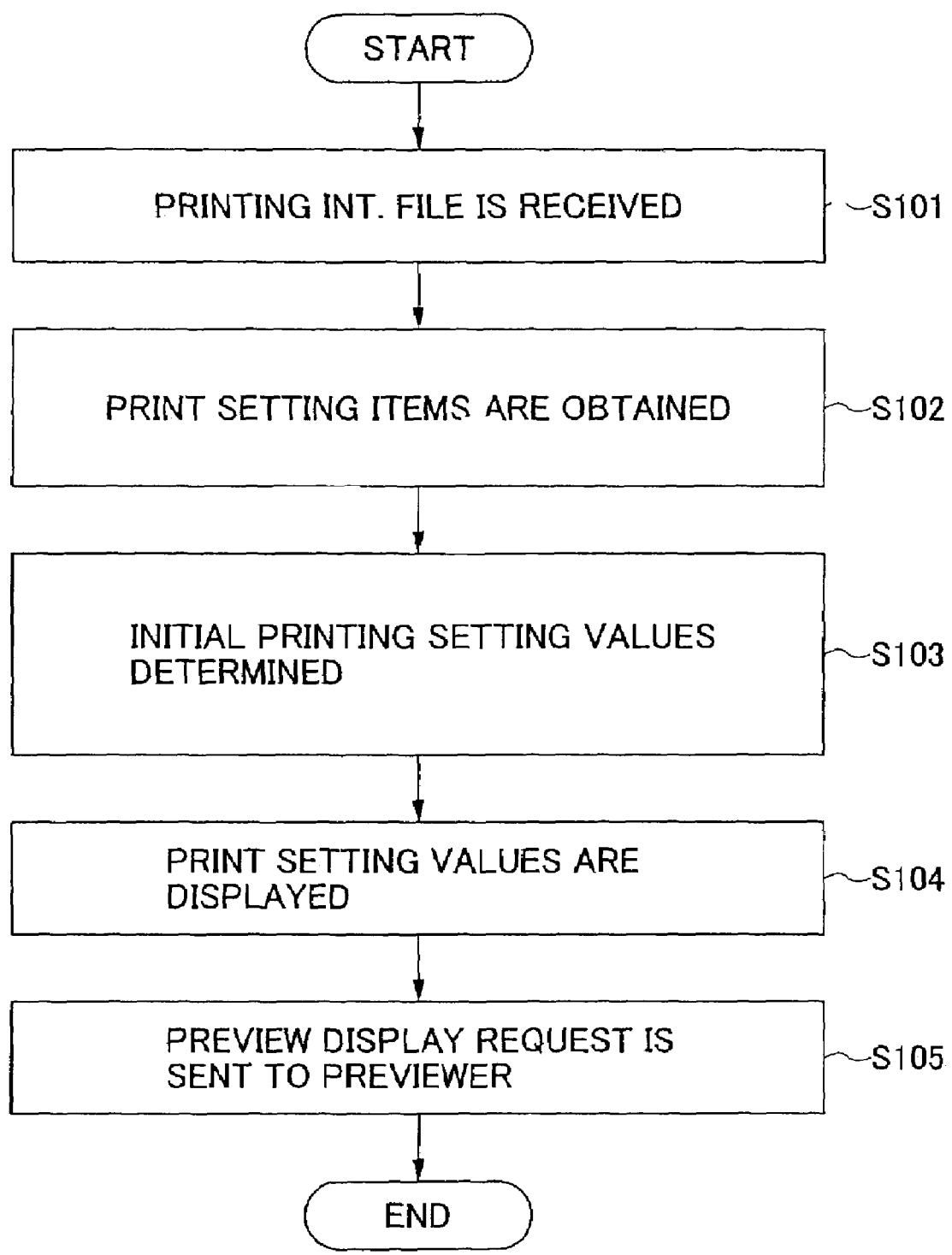
FIG. 14 is a flowchart for explaining the processing of initial setting operation which is executed by the document-management computer of FIG. 12.

FIG. 14 shows initialization operation which the document-management computer 100 of FIG. 12 performs.

In initialization operation of FIG. 14, the printing intermediate data control module 106 receives the printing intermediate file accumulated, and carries out the print setting or the initial setting for the preview screen.

Figure 15:
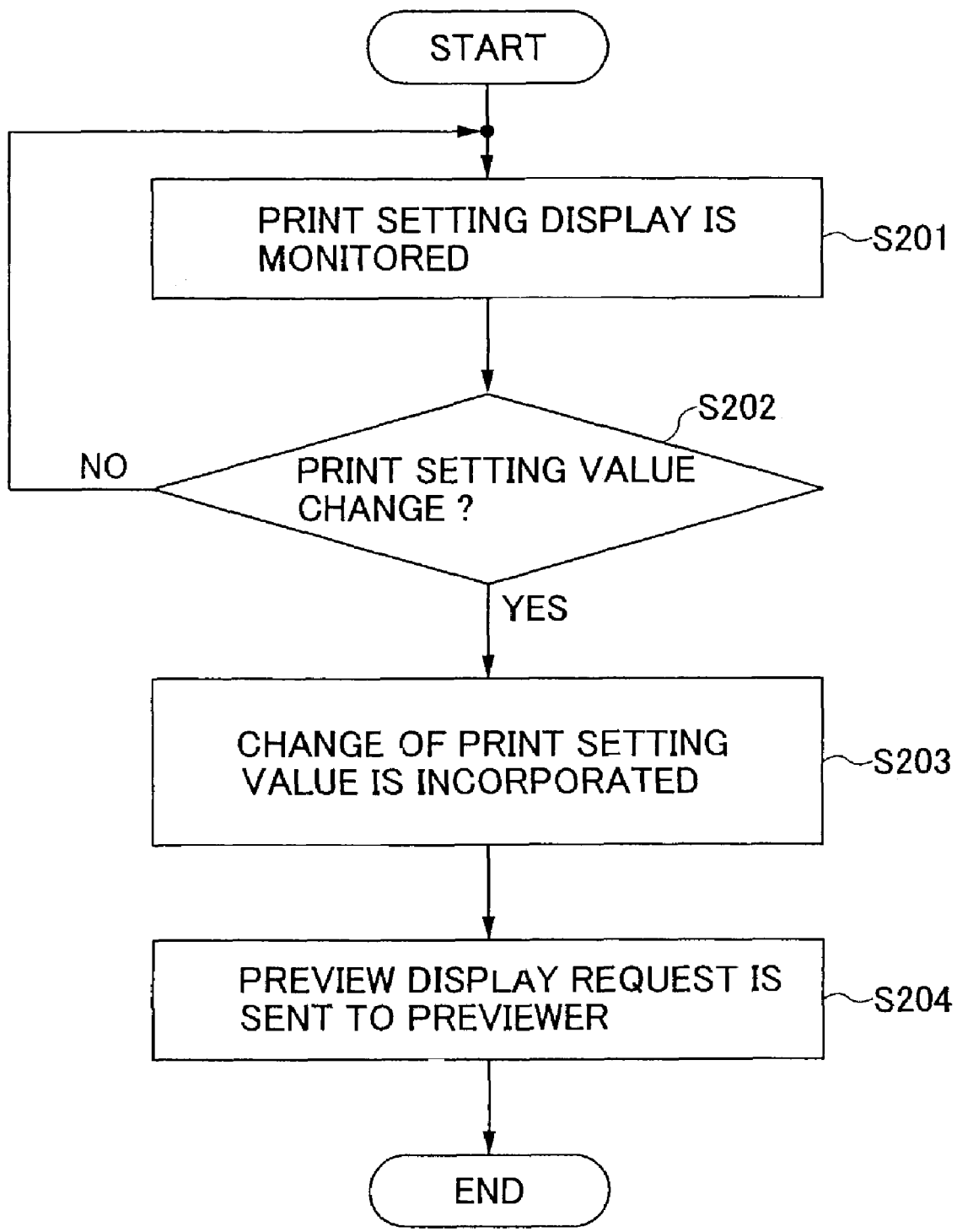
FIG. 15 is a flowchart for explaining the processing of the setting change operation when the setting item is changed in the print setting screen.

FIG. 15 shows the processing of the setting change operation when the setting item is updated in the print setting screen.

Figure 16:
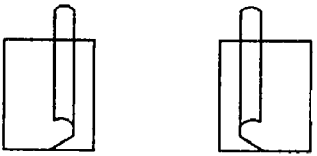
FIG. 16 is a diagram showing an example of the print setting screen.

FIG. 16 shows an example of the print setting screen.

In the example of the print setting screen shown in FIG. 16, it is the example when combined printing being set by "2in11" and setting the punch to the "left."

FIG. 17 shows the print setting command at the time of the print setting screen of FIG. 16.

Here, although the size of the form and the setting of the direction are omitted, the commands PAPER and LAYOUT corresponding to these are contained.

Since the size and the direction of the form which are printed when printing the data of application are set up, this is because these commands are embedded, when printing intermediate data is generated.

First, the operation for the print setting or initial setting for the preview display is explained.

In FIG. 14, the printing intermediate data control module 106 of FIG. 12 receives the accumulated printing intermediate file 105 (S101).

The paper size of the printing intermediate data and the print setting items of the print setting command are acquired, and they are passed to the print setting module 107 (S102).

The print setting module 107 receives the setting information for the printing function and each function to the printer driver 103, and determines the initial print setting (S103).

The document-management computer 100 displays the print setting screen according to the print setting information and the initial value (S104).

The previewer 108 processes and displays the image based on the print setting command received from the print setting module 107 and the drawing data received from the drawing data module 109.

Simultaneously with the print setting items, the print setting module 107 receives the information required for the preview from the printer driver, and passes the drawing request of the preview screen to the previewer 108 (S105).

Next, operation when the setting is updated in the print setting screen is explained.

In FIG. 15, the document-management computer 100 monitors the print setting screen (S201).

The document-management computer 100 determines whether the print setting information is changed or not (S202).

When the setting is changed, the print setting item which does not have conflict with other print setting items to the changed value is acquired, and the print setting item is made to reflect in the print setting screen (S203).

When the step S203 is completed, the document-management computer 100 sends out the drawing request of the preview image to the previewer 108 (S204).

Here, the longitudinal-direction length and the lateral length of the form can be acquired from the size of the form and the setting of the direction, as shown in FIG. 18.

Figure 20:
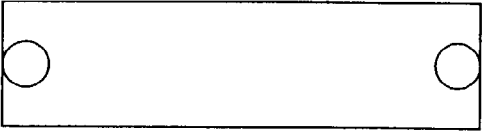
FIG. 20 is a diagram showing the preview information in the case of the punch.

For example, the preview drawing information on combined printing came to be shown in FIG. 19, and the preview drawing information on the punch came to be shown in FIG. 20.

The drawing data is generated as follows. The size of the preview image is 298 mm×210 mm from FIG. 17 and FIG. 18. From the preview information on FIG. 19 and FIG. 20, in order to rotate the form, the size of the form is changed to 210 mm×298 mm. The page number drawn by one side is the two pages. For this reason, the size of the preview image for one page turns into half size.

Since it is not drawn by the back of the form, it is drawn by the one sheet of the form by a total of 2 pages. It becomes (2n−1) page in the left half, and drawing of the page image becomes 2n page in the right half, when there is the n-th form. The additional drawing data exists and the specified image data is drawn by 5 mm of the left edge of the form, and the position of vertical centering.

The preview information is followed and the preview image of FIG. 16 is drawn by the predetermined position on the operation screen.

Since the page information on the lower part of the preview image becomes three form number of sheets actually outputted since it is drawn by 2 pages of the one sheet of form as mentioned above, the display is changed like one third.

The third page will be drawn by the left half and, as for the page number by which it is drawn when performing form turning over and setting the present form number to 2, the 4th page will be drawn by the right half.

Figure 21:
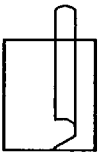
FIG. 21 is a diagram showing another example of the print setting screen.

FIG. 21 shows another example of the print setting screen.

The example of the print setting screen shown in FIG. 21 is the example when the duplex and left-side binding printing is set.

The print setting command becomes as it is shown in FIG. 22, and the information required for the preview becomes as it is shown in FIG. 23.

It turns out that what is necessary is just to draw as follows.

The size of the form is set to 298 mm×210 mm in order not to rotate the form. Since the page number drawn by one side has no change, it is a single page. Since it is drawn by the back of the form, it is drawn by the one sheet of form by a total of 2 pages. The form turning-over instruction is given with the front and the back.

There is the n-th form and drawing of the page image becomes 2n page at the time of the (2n−1) page and the back at the time of the front. The additional image data does not exist.

The above print setting information is followed and the preview image of FIG. 21 is drawn by the predetermined position on the operation screen.

As the page information on the lower part of the preview image was mentioned above, it is drawn by 2 pages of the one sheet of form, and since the form number of sheets actually outputted becomes the three sheets, the display is changed like one third and the display of the front and the back is added further.

When it is the front of the n-th sheet which is currently displayed, the page to display turns into the (2n−1) page. Namely, in the case of the second sheet surface, the third page is displayed.

On the contrary, when it is the back, the page to display becomes 2n page. Namely, the third page is displayed now the case on the back of the second sheet.

When the front of the n-th sheet is currently displayed, the sheet turning-over instructions cause an image of the back of the (n−1)th sheet to be displayed on the operation screen if the "previous" image is requested, and cause an image of the back of the n-th sheet to be displayed on the operation screen the "next" image is requested.

Moreover, when an image of the back of the n-th sheet is currently displayed, an image of the front of the n-th sheet is displayed if the "previous" image is requested, and an image of the front of the (n+1)th sheet is displayed if the "next" image is requested.

For example, when an image of the front of the second sheet is currently displayed, an image of the back of the first sheet is displayed if the "previous" image is requested, and an image of the back of the second sheet is displayed if the "next" image is requested.

Next, the operation for drawing the preview image is explained.

Figure 24:
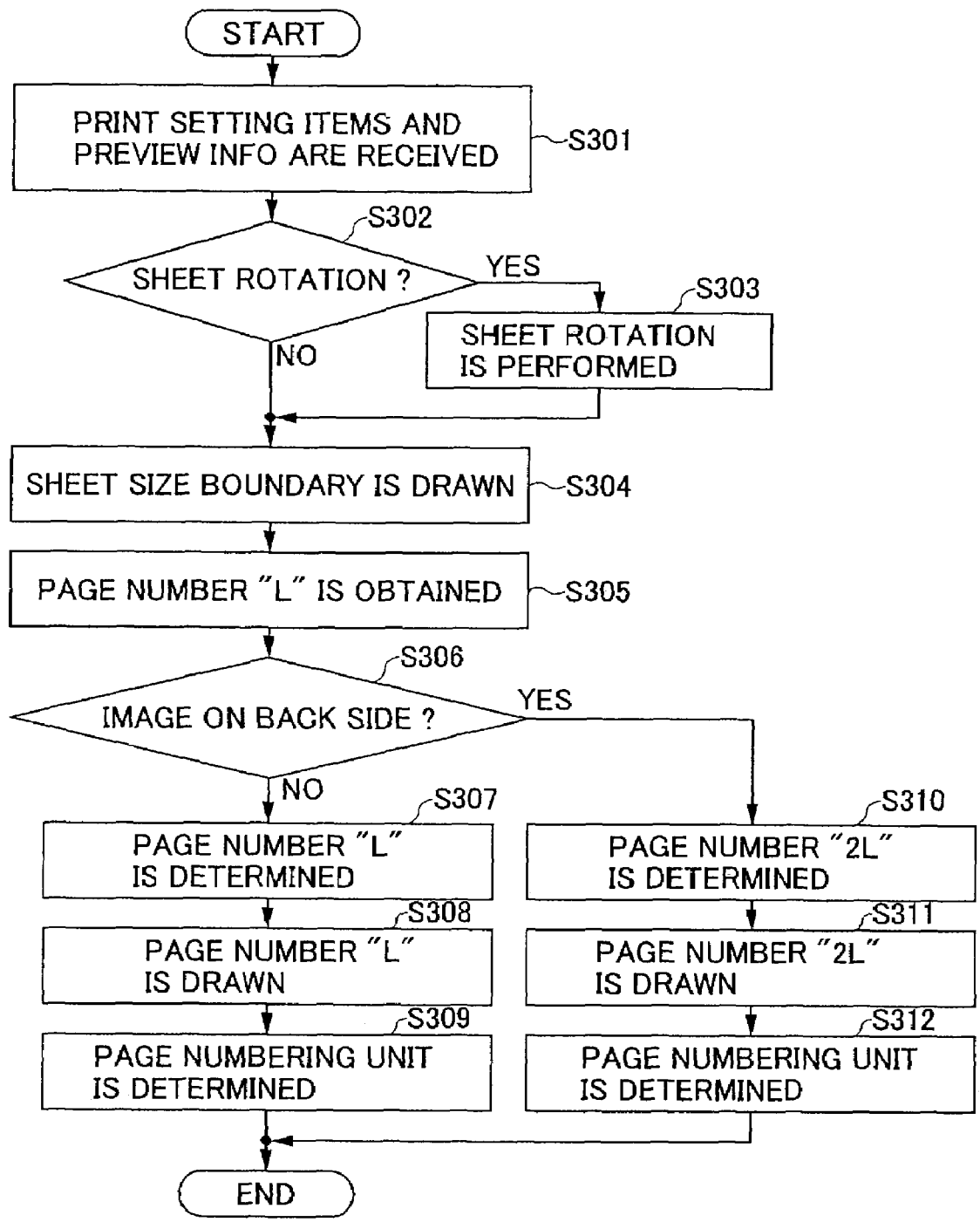
FIG. 24 is a flowchart for explaining the processing of the preview screen preparation which is executed by the document-management computer of FIG. 12.

FIG. 24 shows the processing of the preview screen preparation before drawing the preview image of the page which is performed by the document-management computer of FIG. 12.

As shown in FIG. 24, the preview information over the data of the print setting item, the print setting, and the print setting is received from the print setting module 107 of FIG. 12, and it determines whether page orientation is rotated (S301, S302).

When rotating the page orientation, the length of the form and the horizontal length are replaced (S302; YES, S303).

In order not to rotate the page orientation (S302; NO) or to rotate the page orientation, after replacing the length of the form and the horizontal length, according to the paper size, the form area is drawn in the preview drawing position (S304).

The page number L displayed on one side for the one sheet of form is obtained from the preview information, and it determines whether it is the no drawn by the form back from preview information (S305, S306).

When not drawn by the form back, while the page number drawn by the amount of the one sheet of form is determined as L and draws L in the predetermined part of the preview area, the unit of form turning over is determined for every form (S306; NO, S307-S309).

On the other hand, when drawing at the form back, while the page number drawn by the amount of the one sheet of form is determined as 2L and draws 2L at the predetermined position of the preview area, the unit of form turning over is determined for every one side of the form (S306; YES, S310-S312).

Figure 25:
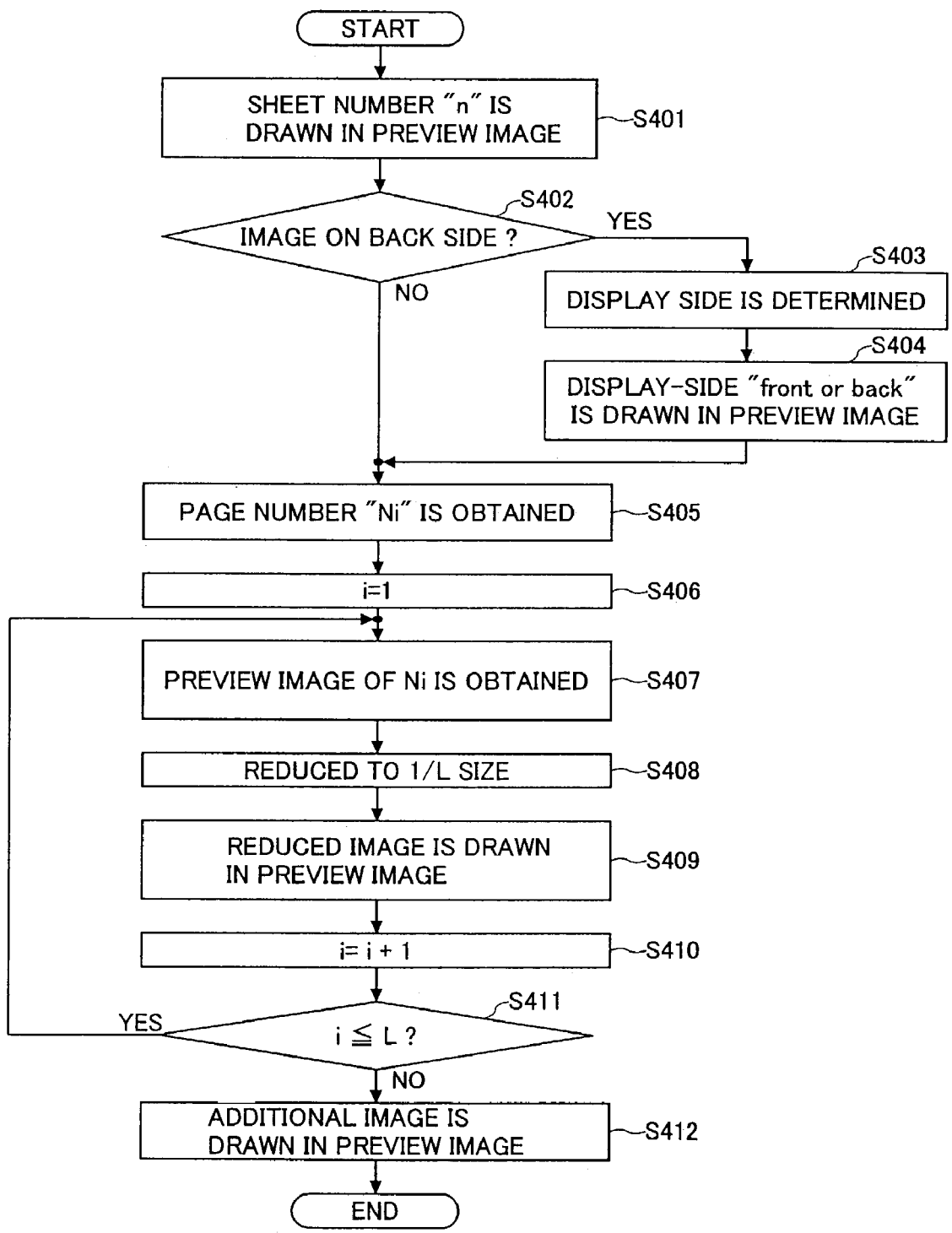
FIG. 25 is a flowchart for explaining the processing of the preview screen displaying which is executed by the document-management computer of FIG. 12.

FIG. 25 shows the processing of the preview screen displaying which is performed by the document-management computer 100.

The preview screen displaying processing of FIG. 25 is the operation of the document-management computer 100 when displaying the preview image of the form page which changes with the time of displaying the preview image first, or turning-over operations.

In FIG. 25, the computer 100 determines whether the form number n to display is determined, n is drawn in the predetermined part of the preview area, and it is drawn by the form back (S401, S402).

When drawn by the form back, it is judged whether the screen is the front or it is the back, and it draws the field information (the table/reverse side) displayed further in the predetermined part of the preview area (S402; YES, S403-S404).

In order not to be drawn by the form back (S402; NO) and to draw at the form back, after the screen's determining whether to be the front or the back and drawing field information in the predetermined part of the preview area, page number nickel (1≦I≦L) displayed to the screen is acquired (S405). Herein, L is the page number (the number of pages in the combined printing) drawn by one side.

When the variable "i" is 1, the preview image of the page number Ni is acquired from the drawing data module 109 of FIG. 12 (S406, S407).

The acquired image is reduced to 1/L, and the image is drawn for the reduced image according to the drawing position information on the image on the form area of the preview area (S408, S409).

When the step S409 is performed, the incrementing of the variable i is performed (S410).

When the variable i has not reached the one-side page number L, it returns to the step S407 and the processing of the steps S407 to S410 is repeated (S411; YES).

And when the drawing processing of all the pages is performed, additional drawing data will be drawn in the predetermined position on the form area (S411; NO, S412).

In addition, although the front and the back are determined as the form number displayed in the following page number or the first step, by the initial display, the front is expressed as the form number 1, and when it is the page after form turning-over operation, the determination method explained above is followed.

The present invention is not limited to the above-described embodiments, and variations and modifications may be made without departing from the scope of the present invention.

Further, the present invention is based on Japanese priority application No. 2001-329798, filed on Oct. 26, 2001, Japanese priority application No. 2001-387850, filed on Dec. 20, 2001, and Japanese priority application No. 2002-305858, filed on Oct. 21, 2002, the entire contents of which are hereby incorporated by reference.

What is claimed is:

1. A document-management apparatus, comprising: a displaying unit displaying both document information managed by a document-management server and image-forming-job information managed by an image-forming-job management server on an operation screen, wherein the operation screen is a single window of the displaying unit;
a first unit performing an image-forming preparation of a specific document contained in the document information according to a transfer request inputted on the operation screen to transfer the specific document from the document-management server to the image-forming-job management server; and
a second unit outputting a specific image-forming job, contained in the image-forming-job information, from the image-forming-job management server to an image-forming device connected to the image-forming-job management server, according to an image-forming request inputted on the operation screen with respect to the specific image-forming job,
wherein the first unit comprises:
an intermediate-file creating unit automatically generating, in response to the transfer request, an intermediate file for image formation based on data of the specific document received from the document-management server, the intermediate-file creating unit storing the generated intermediate file into the image-forming-job management server as an image-forming job; and
a list folder displaying unit displaying on the single window of the displaying unit both a list of all image-forming jobs contained in the image-forming-job information managed by the image-forming-job management server and a set of folders of all image forming devices connected to the image-forming-job management server, and
wherein said image-forming request is inputted on the single window of the displaying unit when said specific image-forming job in the list of all image-forming jobs is dragged and dropped to one of the set of folders corresponding to said image-forming device.

2. The document-management apparatus of claim 1, further comprising:
a viewer starting unit starting a viewer displaying of a specific image-forming job contained in a list of the image-forming-job information managed by the image-forming-job management server; and
a viewer displaying unit generating one-page image data from an intermediate file corresponding to the specific image-forming job displayed by the viewer displaying, and displaying the generated image data on the operation screen.

3. The document-management apparatus of claim 1, further comprising a combination unit selecting a plurality of image-forming jobs contained in a list of the image-forming-job information displayed on the operation screen, and requesting a combination of a plurality of intermediate files corresponding to the plurality of the selected image-forming jobs.

4. The document-management apparatus of claim 1, further comprising:
a combination unit selecting a plurality of image-forming jobs contained in a list of the image-forming-job information displayed on the operation screen, and requesting a combination of a plurality of intermediate files corresponding to the plurality of the selected image-forming jobs;
a position assignment unit assigning arbitrary break positions for a specific image-forming job contained in a list of the image-forming-job information;
a division unit dividing the specific image-forming job into portions at the break positions assigned by the position assignment unit; and a page indication unit specifying a page in the specific image-forming job on the operation screen; and
a page handling unit moving the page specified by the page indication unit to an arbitrary position by movement or copy of the specified page, or deleting the specified page of the image-forming job.

5. A document-management control method, comprising the steps of:
displaying both document information managed by a document-management server and image-forming-job information managed by an image-forming-job management server on an operation screen, wherein the operation screen is a single window of the displaying unit;
performing an image-forming preparation of a specific document contained in the document information according to a transfer request inputted on the operation screen to transfer the specific document from the document-management server to the image-forming-job management server; and outputting a specific image-forming job, contained in the image-forming-job information, from the image-forming-job management server to an image-forming device connected to the image-forming-job management server, according to an image-forming request inputted on the operation screen with respect to the specific image-forming job, wherein the image-forming preparation step includes:

generating, in response to the transfer request, an intermediate file for image formation based on data of the specific document received from the document-management server, and storing the generated intermediate file into the image-forming-job management server as an image-forming job; and displaying on the operation screen both a list of all image-forming jobs contained in the image-forming-job information managed by the image-forming-job management server and a set of folders of all image forming devices connected to the image-forming-job management server, and wherein said image-forming request is inputted on the single window of the displaying unit when said specific image-forming job in the list of all image-forming jobs is dragged and dropped to one of the set of folders corresponding to said image-forming device.

6. The document-management control method of claim 5, further comprising the steps of:

starting a viewer displaying a specific image-forming job contained in a list of the image-forming-job information managed by the image-forming-job management server; and generating one-page image data from an intermediate file corresponding to the specific image-forming job displayed by the viewer displaying, and displaying the generated image data on the operation screen.

7. A computer-readable storage medium storing a computer program embodied therein for causing a computer to execute a document-management control method, the method comprising the steps of:

displaying both document information managed by a document-management server and image-forming-job information managed by an image-forming-job management server on an operation screen, wherein the operation screen is a single window of the displaying unit;

performing an image-forming preparation of a specific document contained in the document information according to a transfer request inputted on the operation screen to transfer the specific document from the document-management server to the image-forming-job management server; and outputting a specific image-forming job, contained in the image-forming-job information, from the image-forming-job management server to an image-forming device according to an image-forming request inputted on the operation screen with respect to the specific image-forming job, wherein the image-forming preparation step includes:

generating, in response to the transfer request, an intermediate file for image formation based on data of the specific document received from the document-management server, and storing the generated intermediate file into the image-forming-job management server as an image-forming job; and displaying on the operation screen both a list of all image-forming jobs contained in the image-forming-job information managed by the image-forming-job management server and a set of folders of all image forming devices connected to the image-forming-job management server, and wherein said image-forming request is inputted on the single window of the displaying unit when said specific image-forming job in the list of all image-forming jobs is dragged and dropped to one of the set of folders corresponding to said image-forming device.

8. A document-management apparatus, comprising:

a printing execution unit receiving a printing intermediate data recorded in a storage device, adding a print setting command to the printing intermediate data, and outputting the printing intermediate data with the print setting command to a printer driver, so that an image forming device is caused to perform printing of the printing intermediate data based on the print setting command; and a displaying unit generating a print setting data including print setting items in consideration of finishing functions, converting the printing intermediate data into drawing data, and processing the drawing data based on the generated print setting data, so that the processed drawing data is displayed on an operation screen as an output image form, the operation screen being a single window of the displaying unit, wherein the printing execution unit further comprises:

a printing intermediate-data creating unit automatically generating, in response to a transfer request inputted on the operation screen, the printing intermediate data for image formation based on data of a specific document received from a document-management server, the printing intermediate-data creating unit storing the generated printing intermediate data into an image-forming-job management server as an image-forming job; and a list folder displaying unit displaying on the single window of the displaying unit both a list of all image-forming jobs contained in an image-forming-job information managed by the image-forming-job management server and a set of folders of all image forming devices connected to the image-forming-job management server, and wherein an image-forming request is generated on the single window of the displaying unit by dragging and dropping a specific image-forming job in the list of all image-forming jobs to one of the set of folders corresponding to said image-forming device.

9. A document-management control method, comprising the steps of:

generating printing intermediate-data in response to a transfer request inputted on an operation screen of a displaying unit, the generated printing intermediate data for image formation is based on data of a specific document received from a document-management server, the generated printing intermediate data is stored in an image-forming-job management server as an image-forming job;

displaying on the operation screen of the displaying unit both a list of all image-forming jobs contained in an image-forming-job information managed by the image-forming-job management server and a set of folders of all image forming devices connected to the image-forming-job management server, wherein the operation screen is a single window of the displaying unit;

receiving the printing intermediate data recorded in a storage device, adding a print setting command to the printing intermediate data, and outputting the printing intermediate data with the print setting command to a printer driver, so that an image forming device connected to the image-forming-job management server is caused to perform printing of the printing intermediate data based on the print setting command; and generating a print setting data including print setting items in consideration of finishing functions, converting the printing intermediate data into drawing data, and processing the drawing data based on the generated print setting data, so that the processed drawing data is displayed on the operation screen as an output image form, wherein an image-forming request is inputted on the single window of the displaying unit by dragging and dropping a specific image-forming job in the list of all image-forming jobs to one of the set of folders corresponding to said image-forming device.

10. The document-management control method of claim 9 wherein, when a next image is requested on the operation screen after an image of one side of a present form is displayed on the operation screen, an image of one side of a form following the present form is displayed on the operation screen.

11. The document-management control method of claim 9 wherein, when a previous image is requested on the operation screen after an image of one side of a present form is displayed on the operation screen, an image of one side of a form preceding the present form is displayed on the operation screen.

12. The document-management control method of claim 9 wherein, when a next image is requested on the operation screen after a duplex print setting is selected and an image of one side of a present form is displayed on the operation screen, an image of a back side of the present form is displayed on the operation screen if the displayed side of the present form is a front side thereof, and an image of a front side of a form following the present form is displayed on the operation screen if the displayed side of the present form is a back side thereof.

13. The document-management control method of claim 9 wherein, when a previous image is requested on the operation screen after a duplex print setting is selected and an image of one side of a present form is displayed on the operation screen, an image of a front side of the present form is displayed on the operation screen if the displayed side of the present form is a back side thereof, and an image of a back side of a form preceding the present form is displayed on the operation screen if the displayed side of the present form is a front side thereof.

14. A computer-readable storage medium storing a computer program embodied therein for causing a computer to execute a document-management control method, the method comprising the steps of:

generating printing intermediate-data in response to a transfer request inputted on an operation screen of a displaying unit, the generated printing intermediate data for image formation is based on data of a specific document received from a document-management server, the generated printing intermediate data is stored in an image-forming-job management server as an image-forming job;

displaying on the operation screen of the displaying unit both a list of all image-forming jobs contained in an image-forming-job information managed by the image-forming-job management server, and a set of folders of all image forming devices connected to the image-forming-job management server, wherein the operation screen is a single window of the displaying unit, receiving the printing intermediate data recorded in a storage device, adding a print setting command to the printing intermediate data, and outputting the printing intermediate data with the print setting command to a printer driver, so that an image forming device is caused to perform printing of the printing intermediate data based on the print setting command; and generating a print setting including print setting items in consideration of finishing functions, converting the printing intermediate data into drawing data, and processing the drawing data based on the generated print setting, so that the processed drawing data is displayed on the operation screen as an output image form wherein an image-forming request is created on the single window of the displaying unit by dragging and dropping a specific image-forming job in the list of all image-forming jobs to one of the set of folders corresponding to said image-forming device.

* * * * *